United States Patent [19]
Olsen

[11] Patent Number: 5,443,809
[45] Date of Patent: Aug. 22, 1995

[54] MANUFACTURE OF CATHODE MATERIALS BY THE DECOMPOSITION OF AMMONIUM METAL OXIDES IN A FLUIDIZED BED

[75] Inventor: Ib I. Olsen, San Jose, Calif.

[73] Assignee: Valence Technology, Inc., San Jose, Calif.

[21] Appl. No.: 248,024

[22] Filed: May 24, 1994

[51] Int. Cl.⁶ .................................................. C01G 31/02
[52] U.S. Cl. ........................................................ 423/592
[58] Field of Search ............................................ 423/592

[56] References Cited

U.S. PATENT DOCUMENTS

| | | | |
|---|---|---|---|
| 3,333,916 | 8/1967 | Burwell | 423/592 |
| 3,410,652 | 11/1968 | Hausen et al. | 423/592 |
| 4,035,476 | 7/1977 | Ilmaier et al. | 423/592 |
| 4,119,707 | 10/1978 | Thome et al. | 423/592 |
| 4,228,226 | 10/1980 | Christian et al. | 423/592 |
| 4,486,400 | 12/1984 | Riley | 423/592 |
| 4,965,150 | 10/1990 | Dahn et al. | 423/592 |

FOREIGN PATENT DOCUMENTS 749865  1/1967  Canada .................... 423/592

Primary Examiner—Steven Bos
Attorney, Agent, or Firm—Robert Krebs

[57] ABSTRACT

Disclosed is a continuous process for the synthesis of electrode-quality metal oxide particles by the thermal decomposition of ammonium metal oxides in a fluidized bed under oxidation/reduction conditions which are controlled by the temperature and ammonium content of the process gas.

3 Claims, 1 Drawing Sheet

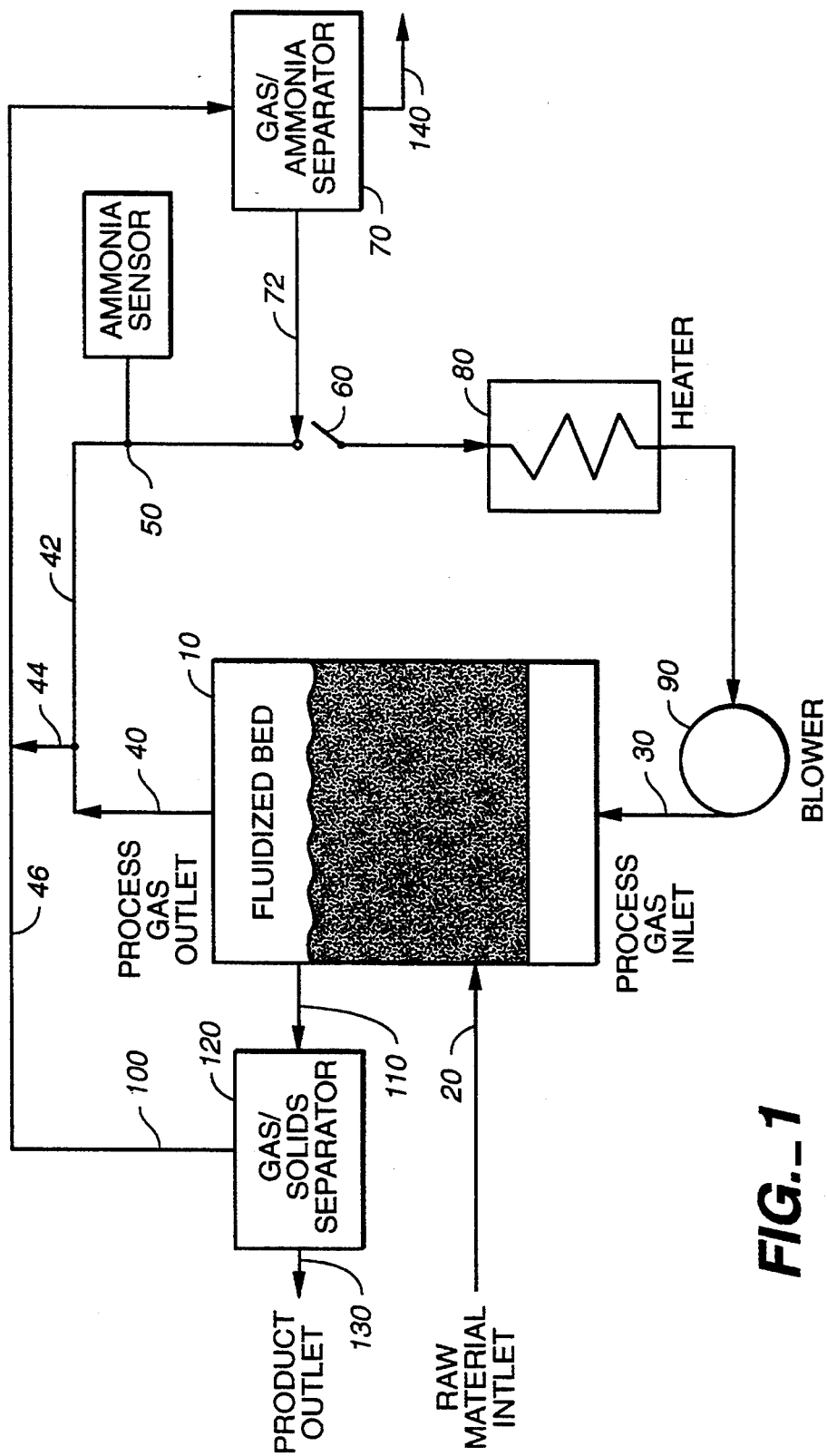
FIG._1

MANUFACTURE OF CATHODE MATERIALS BY THE DECOMPOSITION OF AMMONIUM METAL OXIDES IN A FLUIDIZED BED

BACKGROUND OF THE INVENTION

1. Field of the Invention

The present invention relates to novel processes for the continuous production of stoichiometric or non-stoichiometric electrode-quality metal oxides.

2. State of the Art

Solid-state lithium electrochemical cells are known in the art and typically consist of a lithium-containing metal anode, a lithium ion-conducting solid electrolyte and a cathode comprising a lithium ion insertion electrode material. Examples of such cathodic materials include $V_2O_5$, $TiS_2$, $V_6O_{13}$ and $LiCoO_2$.

Such intercalation materials are capable of acting as a cathode by virtue of their ability to reversibly accommodate lithium ions physically inserted into their crystallographic structure during discharge of the cell, and subsequently removed therefrom during charging of the cell. The amount of lithium and its ease of insertion in the cathode material depends on the crystallographic lattice structure of the material, and the number and nature of its lattice defects, as well as on the composition of the material. Therefore, materials of the same empirical formula will differ remarkably in their properties as cathode materials. For example, $VO_y$, where $y=2.5$, is the empirical formula of both $V_2O_5$ and $V_6O_{15}$; but the former is the stable vanadium pentoxide having well known drawbacks as a cathode active material, while the latter is the limiting composition of solid vanadium oxide and has a structure similar to $V_6O_{13}$.

Like other elements in the transition metal group including niobium and tantalum, vanadium forms numerous and frequently complicated compounds because of its variable valance. The four principle oxidation states of vanadium are 2+, 3+, 4+ and 5+, and it forms derivatives from more or less well defined radicals such as $VO^{2+}$ and $VO^{3+}$. However, vanadium oxide solids possess nominal stoichiometries which indicate a mixture of vanadium oxidation states can be present in the solid phases of vanadium.

Solid lithium electrochemical cells using $V_6O_{13}$ ($VO_{2.16}$) as the cathode active material are well studied. K. West et al., J. Power Sources 14 (1985) 235, studied $V_6O_{13}$ as a cathode material for lithium cells using polymeric electrolytes. They found the lithium insertion reaction was reversible in the composition interval $Li_xV_6O_{13}$ [$0 \leq x \leq 8$]. The high stoichiometric energy density for the ultimate composition $Li_xV_6O_{13}$, 890 Wh/kg, is very favorable for battery applications. But this study indicated unfavorable capacity decreases occur upon cycling the $Li_xV_6O_{13}$ cells.

D. W. Murphy et at., J. Electrochemical Soc., 128 (1981) 2053, report the synthesis of $V_6O_{13+x}$ [$0<x\leq0.5$], corresponding to the empirical formula ($VO_{2.16}$—$VO_{2.25}$), by thermal decomposition of $NH_4VO_3$ under a stream of argon. The product's powder x-ray diffraction pattern was similar to that of $V_6O_{13}$. Murphy et at. studied the vanadium oxides $V_3O_7$, $V_4O_9$, $V_6O_{13}$ and $V_6O_{13+x}$ [$0<x<0.5$] as cathode materials in ambient temperature non-aqueous secondary lithium cells. According to Murphy et at., the best cathode materials were $V_6O_{13}$ and the slightly oxygen rich $V_6O_{13+x}$ [$0<x\leq0.2$], i.e. corresponding to ($VO_{2.16}$—$VO_{2.20}$). Only these cathode materials consistently exhibited substantial capacities, good rechargability, and high average potentials. Therefore, Murphy et al. concluded that these materials make the best candidates for use as cathode active materials in non-aqueous lithium secondary batteries. However, the discharge capacity of cells containing these materials as cathode active materials was found to diminish upon cycling and was found to be very temperature dependent.

U.S. Pat. No. 4,228,226 reports that vanadium oxides with nominal compositions close to $V_6O_{13}$ having empirical formulas from $VO_{2.1}$—$VO_{2.2}$, i.e. corresponding to $V_6O_{13+x}$ [$0 \leq x \leq 0.2$], are readily prepared by the thermal decomposition of $NH_4VO_3$ at a controlled rate in an inert or reducing atmosphere at a temperature of approximately 450° C. This patent also reports that vanadium oxides which have empirical formula $VO_{2+y}$ [$0 \leq y \leq 0.4$] are useful as cathode materials in non-aqueous cells using lithium or lithium alloy as the anode. In a preferred embodiment, it was reported that the active cathode material has nominal stoichiometry $V_6O_{13}$ and the empirical formula ($VO_{2.1}$—$VO_{2.2}$). However, the variation of cell capacity when using such materials as the cathode active component in a lithium cell was not reported.

U.S. Pat. No. 4,075,397 discloses, amongst many cathode active materials, a material of empirical formula $VO_y$ [$1.8 \leq y \leq 3.2$], exemplified by $V_2O_5$, i.e. $VO_{2.5}$.

It would be advantageous to create new vanadium oxides of crystallographic structure close to that of $V_6O_{13}$ but having superior properties as cathode active materials.

Intercalation compounds for electrochemical cathodes are normally based on transition metal oxides produced in batch processes of limited capacity. Batch processes are difficult to scale-up. Interest is focused on ammonium metal oxides, particularly ammonium transition metal oxides which are the source of numerous intercalation compounds, such as $V_6O_{13}$, that find extensive use in lithium secondary batteries.

In the production of electrode-quality metal oxides, ammonium metal oxides are heated to high temperatures to release ammonia by thermal decomposition. Ammonia decomposes at high temperature according to the equilibrium reaction $NH_3 \rightleftharpoons N_2 + 3H_2$. High temperatures and low pressures push the equilibrium to the right. The presence of hydrogen can reduce metal oxides to lower oxides with the simultaneous production of water vapor. By the appropriate control of temperature and pressure, and by the addition or subtraction of inert gas and ammonia, it is possible to control the oxidation state of the metal oxides produced. For example, using ammonium metavanadate as the feed stock, thermal decomposition produces $V_6O_{13}$ and higher oxides of vanadium.

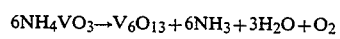
$6NH_4VO_3 \rightarrow V_6O_{13} + 6NH_3 + 3H_2O + O_2$

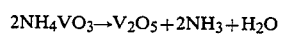
$2NH_4VO_3 \rightarrow V_2O_5 + 2NH_3 + H_2O$

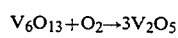
$V_6O_{13} + O_2 \rightarrow 3V_2O_5$

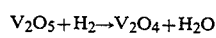
$V_2O_5 + H_2 \rightarrow V_2O_4 + H_2O$

It is difficult to control the ammonia content of a batch reactor during the thermal decomposition of ammonium vanadate so as to produce $V_6O_{13}$ of very high purity.

U.S. Pat. No. 4,486,400 describes a process for preparing stoichiometric $V_6O_{13}$ usable as cathode active material, by means of a three-step process involving: (1) the heating of ammonium metavanadate in a dynamic atmosphere of nitrogen gas; (2) holding the vanadium oxide so produced at 350°–400° C. for 4 hours in nitrogen; and (3) heating the vanadium oxide at about 400°–500° C. for 8–12 hours in a dynamic atmosphere including oxygen at the partial pressure of oxygen over stoichiometric $V_6O_{13}$ at that temperature. U.S. Pat. No. 4,619,822 describes a process for the synthesis of $V_6O_{13}$ by the reduction of $V_2O_5$ in the presence of a reducing gas which is a mixture of CO and $CO_2$, i.e., $V_2O_5 +- 2CO \rightarrow 2CO_2 + V_6O_{13}$. U.S. Pat. Nos. 4,119,707 and 3,333,916 describe processes for the production of $V_2O_5$ from ammonium metavanadate.

SUMMARY OF THE INVENTION

This invention is directed to a continuous process for the synthesis of an electrode-quality metal oxide from ammonium metal oxide which method comprises:

feeding the ammonium metal oxide as a particulate into a fluidized bed reactor;

feeding a process gas comprising ammonia and an inert gas into the reactor;

contacting the ammonium metal oxide particulate with the process gas under controlled oxidation/reduction conditions to produce particles of electrode-quality metal oxide;

removing process gas from the reactor;

adjusting the ammonia content of the process gas by separating ammonia from, or adding ammonia to, the process gas to produce a process gas of controlled ammonia content;

recycling the process gas of controlled ammonia content to the reactor; and removing electrode-quality metal oxide particles from the reactor.

The continuous process of the invention finds use with any metal oxide prepared by thermal decomposition of the corresponding ammonium metal oxide and in particular when the metal is a transition metal oxide, and preferably when the metal is selected from the group consisting of titanium, vanadium, chromium, manganese, iron, cobalt, nickel, copper, niobium and molybdenum.

The ammonium metal oxide finding use within the scope of the present invention may also contain chemical elements selected from the group consisting of nitrogen, hydrogen, carbon, sulfur, halogen, phosphorous and combinations thereof.

The inventive process is applicable to the thermal decomposition of ammonium metavanadate which yields electrode-quality $V_6O_{13}$ or higher oxides by controlling the oxidation/reduction conditions in the process. Specifically, $V_6O_{13}$ is produced under reduction process conditions (temperature from about 400° to about 480° C. and ammonia content in the process gas of from about 10 volume percent to about 30 volume percent), and $V_2O_5$ is produced under oxidation process conditions (temperature from about 370° to about 450° C. and ammonia content in the process gas of less than 10 volume percent.

In general, the process conditions when used with ammonium metavanadate feed stock include temperatures in the range of approximately 370° to 480° C. and process gas ammonia content in the range of approximately 5 to 30 volume percent.

Under controlled conditions of oxidation/reduction, it is possible to synthesize the non-stoichiometric vanadium oxides $V_6O_{13+x}$, where x is approximately $0 < x \leq 0.5$.

BRIEF DESCRIPTION OF THE DRAWING

FIG. 1 is a schematic drawing of the process for production of electrode-quality metal oxides by the decomposition of ammonium metal oxide in a fluidized bed reactor.

DETAILED DESCRIPTION OF PREFERRED EMBODIMENTS

Referring to FIG. 1, a dried ammonium metal oxide particulate is introduced via inlet 20 to a fluidized bed reactor 10 wherein the particulate is dynamically maintained in the fluidized state by heated process gas introduced into the reactor through 30. The fluidized bed is maintained at a temperature in the range of about 370° to 480° C. by the flow of heated process gas from blower 90 and heater 80. Process gas and gaseous reaction products of the thermal decomposition of the ammonium metal oxide are removed from the reactor via outlet 40.

A portion of the exiting gas flows through conduit 42 to an ammonia sensor device 50 which continuously senses the absolute ammonia content of the exiting gas by such means as mass spectrometry or ultraviolet spectroscopy. The bulk of the exiting gas flows through conduits 44 and 46 to a gas/ammonia separator 70. In general, the gas/ammonia separator 70 adjusts the ammonia content of the recycled process gas by absorption of ammonia from the exiting gas, for example, by absorption in water. However, if necessary, ammonia may be added to the process gas at this point. A portion of the exiting gas is bled from the gas/ammonia separator via 140 to control the level of non-condensable gases in the recycled process gas.

The recycling process gas, with added inert gas, and if necessary, ammonia added to adjust the ammonia level in the reactor flows through conduit 72 to ammonia sensor 60. Ammonia sensor 60 makes a final determination of the absolute ammonia content of the recycled process gas before it enters heater 80 and reactor 10.

The combined readings of ammonia content at 50 and 60 permit close control of the ammonia content of the recycled process gas. By means of monitoring and adjusting the ammonia content of the recycled process gas, and the temperature, the oxidation/reduction conditions in the fluidized bed are closely controlled.

The product, electrode-quality metal oxide particle, exit from the dilute phase of the fluidized bed through 110. A gas/solids separator 120, such as a cyclone, separates the product particulate via 130 from the entraining gas which exits via 100 for recycle.

The particle size of the ammonium metal oxide feedstock employed in the methods of this invention is, on average, from about 0.1 $\mu$m to about 100 $\mu$m, and preferably from about 1 $\mu$m to about 10 $\mu$m.

Similarly, the product particle size is, on average, approximately in the range of from about 0.1 $\mu$m to about 100 $\mu$m, preferably from about 1 $\mu$m to about 10 $\mu$m. While there is no net effect on the size of the product particle as compared to the feedstock, it is contemplated that the product particle may have a different size distribution and/or different porosity as compared to the feedstock.

The ammonium metal oxides which can find use as feedstocks within the scope of the present invention, may comprise chemical elements other than nitrogen and oxygen. Examples of suitable feedstocks include, by way of example, ammonium chromate $(NH_4)_2CrO_4$; ammonium iron bisulfate, $Fe(NH_4)_2(SO_4)_2$; ammonium manganese phosphate, $MnNH_4PO_4$; ammonium molybdate, $(NH_4)_2MoO_4$; ammonium nickel trichloride, $NH_4NiCl_3$; ammonium nickel bisulfate, $(NH_4)_2Ni(SO_4)_2$; ammonium permanganate, $NH_4MnO_4$; and ammonium metavanadate, $NH_4VO_3$.

What is claimed is:

1. A continuous process for the preparation of electrode-quality vanadium oxide, having the formula $V_6O_{13}$ from $NH_4VO_3$ which process comprises:

feeding $NH_4VO_3$ particulates into a fluidized bed reactor;

feeding a process gas comprising ammonia and an inert gas into the reactor wherein the process gas has an ammonia content of from about 10 to about 30 volume percent of the process gas;

contacting said $NH_4VO_3$ particulates with said process gas and maintaining the $NH_4VO_3$ particulates at a temperature from about 400° C. to about 480° C. to produce particles of said $V_6O_{13}$;

removing process gas and gaseous reaction products in an exit gas stream from said reactor;

removing gaseous reaction products from said exit gas stream and adjusting the ammonia content in said exit gas stream by separating ammonia from, or adding ammonia to, said exit gas stream to produce a process gas having said ammonia content for recycling into said reactor; and removing said particles of said $V_6O_{13}$ from said reactor.

2. A continuous process for the preparation of electrode-quality $V_2O_5$ from $NH_4VO_3$ which process comprises:

feeding $NH_4VO_3$ particulates into a fluidized bed reactor;

feeding a process gas comprising ammonia and an inert gas into the reactor wherein the process gas has an ammonia content of less than 10 volume percent of the process gas;

contacting said $NH_4VO_3$ particulates with said process gas and maintaining the $NH_4VO_3$ particulates at a temperature from about 370° C. to about 450° C. to produce particles of $V_2O_5$;

removing process gas and gaseous reaction products in an exit gas stream from said reactor;

removing gaseous reaction products from said exit gas stream and adjusting the ammonia content in said exit gas stream by separating ammonia from, or adding ammonia to, said exit gas stream to produce a process gas having said ammonia content for recycling into said reactor; and removing said particles of $V_2O_5$ particles from said reactor.

3. The continuous process according to claim 2 wherein the process gas has an ammonia content of from about 5 to 10 volume percent.

* * * * *